(12) United States Patent
Striedelmeyer et al.

(10) Patent No.: US 9,803,482 B2
(45) Date of Patent: Oct. 31, 2017

(54) ROTOR FOR A TURBINE OR A COMPRESSOR OR A TURBINE/COMPRESSOR GEOMETRY

(71) Applicant: Bosch Mahle Turbo Systems GmbH & Co. KG, Stuttgart (DE)

(72) Inventors: Thomas Striedelmeyer, Stuttgart (DE); Jochen Schray, Oberriexingen (DE); Andreas Prang, Nuertingen (DE); Christian Holzschuh, Stuttgart (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 351 days.

(21) Appl. No.: 14/598,176

(22) Filed: Jan. 15, 2015

(65) Prior Publication Data

US 2015/0198043 A1 Jul. 16, 2015

(30) Foreign Application Priority Data

Jan. 16, 2014 (DE) .................. 10 2014 200 735
Jul. 7, 2014 (DE) .................. 10 2014 213 132

(51) Int. Cl.
*F01D 5/04* (2006.01)
*F04D 29/20* (2006.01)
(Continued)

(52) U.S. Cl.
CPC ............ *F01D 5/025* (2013.01); *B23K 1/0018* (2013.01); *F04D 29/023* (2013.01); *F04D 29/20* (2013.01);
(Continued)

(58) Field of Classification Search
CPC ........ F01D 5/025; F04D 29/20; F04D 29/263; F04D 29/266; F05D 2230/232;
(Continued)

(56) References Cited

U.S. PATENT DOCUMENTS 4,986,733 A 1/1991 Fleury et al.
5,066,547 A 11/1991 Ishida et al.
(Continued)

FOREIGN PATENT DOCUMENTS

DE 3738081 A1 5/1989
DE 69017037 T2 9/1995
(Continued)

OTHER PUBLICATIONS

English abstract for DE-3708081.
(Continued)

*Primary Examiner* — Ninh H Nguyen
(74) *Attorney, Agent, or Firm* — Fishman Stewart PLLC

(57) ABSTRACT

A rotor for at least one of a turbine and a compressor of a supercharging device may include a shaft defining an axis of rotation and at least one impeller. The at least one impeller may have a thread which is arranged coaxially to the axis of rotation. The shaft may include a complementary thread which is arranged coaxially to the axis of rotation. The shaft and the at least one impeller may be secured together via the respective threads. The shaft and the at least one impeller may be fixed with respect to one another via at least one of a soldered connection, a welded connection, an adhesive bond, a clamped connection and a crystallization connection.

20 Claims, 9 Drawing Sheets

(51) Int. Cl.
  *F01D 5/02* (2006.01)
  *F04D 29/26* (2006.01)
  *B23K 1/00* (2006.01)
  *F04D 29/02* (2006.01)
  *B23K 101/00* (2006.01)

(52) U.S. Cl.
  CPC ...... *F04D 29/266* (2013.01); *B23K 2201/001* (2013.01); *F05D 2220/40* (2013.01); *F05D 2230/232* (2013.01); *F05D 2230/238* (2013.01); *F05D 2230/60* (2013.01); *F05D 2230/90* (2013.01); *F05D 2240/60* (2013.01); *F05D 2300/174* (2013.01); *F05D 2300/182* (2013.01); *Y10T 29/49243* (2015.01); *Y10T 29/49245* (2015.01)

(58) Field of Classification Search
  CPC ........... F05D 2230/238; F05D 2230/22; F05D 2230/60; F05D 2240/60; Y10T 29/49243; Y10T 29/49245; Y10T 29/49329
  See application file for complete search history.

(56) References Cited

U.S. PATENT DOCUMENTS

| | | | |
|---|---|---|---|
| 5,961,247 A * | 10/1999 | Gold | F01D 5/025 403/369 |
| 6,499,969 B1 * | 12/2002 | Tombers | F01D 5/025 416/204 A |
| 6,563,074 B2 | 5/2003 | Bazukuri et al. | |
| 7,287,960 B2 * | 10/2007 | Decker | F01D 5/025 416/213 R |
| 2005/0036893 A1 | 2/2005 | Decker | |
| 2006/0127243 A1 | 6/2006 | Vaccarezza et al. | |

FOREIGN PATENT DOCUMENTS

| | | |
|---|---|---|
| DE | 60123860 T2 | 3/2007 |
| DE | 602004011156 T2 | 12/2008 |
| EP | 150702 A2 | 8/1985 |
| EP | 1273757 A1 | 1/2003 |
| JP | 2011-117540 A | 6/2011 |
| KR | 10-1336331 B1 | 12/2013 |

OTHER PUBLICATIONS

English abstract for KR-10-1336331.
German Search Report for DE-102014200735.6, dated Mar. 12, 2014.
English abstract for JP-2011-117540.
Chinese Office Action for CN-2017022401602980, dated Mar. 1, 2017.

* cited by examiner

ROTOR FOR A TURBINE OR A COMPRESSOR OR A TURBINE/COMPRESSOR GEOMETRY

CROSS-REFERENCE TO RELATED APPLICATIONS

This application claims priority to German Patent Application No. 10 2014 200 735.6, filed Jan. 16, 2014, and German Patent Application No. 10 2014 213 132.4, filed Jul. 7, 2014, both of which are hereby incorporated by reference in their entirety.

TECHNICAL FIELD

The present invention relates to a rotor for a turbine or a compressor, in particular for a supercharging device, for example an exhaust gas turbocharger, according to the preamble of claim 1. The invention furthermore relates to a supercharging device having such a rotor and to a method for connecting shaft and impeller.

BACKGROUND

Connecting a shaft and an impeller of a rotor by means of friction or beam welding is known from the prior art. Disadvantageous in these connecting methods is the presence of hot cracks in a highly loaded zone of the impellers. This disadvantage occurs in particular when using weight-optimised materials such as for example gamma-TiAl alloys, iron aluminide alloys and ceramic materials, since these are difficult to beam-weld if at all.

Furthermore, a screw connection between shaft and impeller is known from EP 1273757.

SUMMARY

The present invention is based on the object of providing an improved connection between shaft and impeller for a rotor of the generic type.

According to the invention, this object is solved through the subjects of the independent claims. Advantageous embodiments are subject of the dependent claims.

The present invention is based on the general idea of combining a mechanical connection with an additional lock in the form of a soldered/welded or adhesive bond between a shaft and at least one impeller of a rotor. The rotor according to the invention in this case comprises a thread which is arranged on the at least one impeller, which is formed coaxially to the axis of rotation of the rotor, and a complementary thread arranged on the shaft which is formed coaxially to the axis of rotation of the rotor, wherein the shaft and the at least one impeller are screwed to one another and the shaft and the impeller are fixed with respect to one another by a soldered connection and/or a welded connection and/or by an adhesive bond and/or by a crystallization connection and/or by a clamping connection. In this way, a simple and sturdy construction can be realized, wherein at the same time the formation of hot cracks due to the soldered/welded connection between the at least one impeller and the shaft is reduced since the main load is absorbed by the mechanical screw connection and the soldered/welded connection can therefore be formed smaller/weaker. Because of this, materials can also be employed which are difficult to weld if at all and which because of their mechanical characteristics have advantages such as for example reduced weight or increased mechanical stability. Such a rotor according to the invention is particularly well suited for a supercharging device, in particular an exhaust gas turbocharger, since through the weight reduction a lower moment of inertia is achieved and because of this the response behaviour of the supercharging devices is improved.

Furthermore, in the case of an adhesive bond or a clamped connection or a crystallization connection introduction of heat can be entirely omitted as a result of which the formation of hot cracks is prevented. In addition to this, different materials of the shaft and of the impeller can be advantageously connected to one another through the adhesive bond. Depending on the choice of the adhesive, corrosion protection, for example against acidic or alkaline media can also be achieved through the adhesive bond. Furthermore, the structures of the connected parts are not changed through these types of connection so that a weakening at the connecting points is prevented.

In the description and the attached claims the term "impeller" comprises both a turbine wheel as well as a compressor wheel. It is also evident that the teaching according to the invention can also be employed for connecting both shaft and turbine as well as shaft and compressor wheel of a supercharging device.

An advantageous further development of the solution according to the invention provides that the thread arranged on the at least one impeller is formed by an external thread arranged on a threaded pin and the thread arranged on the shaft is formed by an internal thread arranged in a bore or that the thread arranged on the at least one impeller is formed by an internal thread arranged in a bore and the thread arranged on the shaft by an external thread arranged on an threaded pin. Preferentially, the bore is formed as a blind hole bore. Through this simple configuration of the threads a sturdy mechanical connection and additionally radial centring between the shaft and the at least one impeller is achieved.

An advantageous further development of the solution according to the invention provides that the threaded pin comprises a centring portion with a fit diameter and that the bore comprises a centring portion with a diameter which together with the centring portion of the threaded pin brings about radial guidance and radial centring of the at least one impeller and the shaft relative to one another. Because of this, the imbalance of the rotor can be reduced. In addition to this, the joining process through soldering/welding/adhesive/clamping later on is positively influenced through the combination of thread and fit. Because of the minor radial clearance between impeller and the shaft little distortion occurs during the soldering/welding/adhesive/clamping. In addition, the process forces that develop during the soldering/welding/adhesive/clamping are absorbed by the thread that the effort for positioning shaft and impeller during the soldering/welding/adhesive/clamping is reduced.

A favourable further development of the solution according to the invention provides that the shaft comprises a contact surface and the at least one impeller comprises a contact surface, wherein the contact surface of the shaft and the contact surface of the at least one impeller at least partially contact one another in the assembled state. In this way, further fixing between the shaft and the at least one impeller is achieved, in particular a risk of canting between the shaft and the at least one impeller is at least reduced because of this. Because of this, in turn, distortion during the connection in particular during the soldering/welding/adhesive/clamping is reduced.

It is favourable when the contact surfaces are formed annularly and are arranged perpendicularly and coaxially to the axis of rotation.

An advantageous solution provides that the rotor comprises a welded and/or soldered and/or adhesive bond and/or clamped connection between the contact surface of the at least one impeller and the contact surface of the shaft. In this way, the connection, in particular the adhesive bond can additionally serve as a seal against liquid and gaseous media.

A further advantageous solution provides that the rotor comprises a welded and/or soldered connection and/or clamped connection and/or a crystallization connection between the thread of the impeller and the thread of the shaft. In this way, a particularly large area for the connection is available so that high durability can be achieved.

A further particularly advantageous solution provides that the rotor comprises an adhesive bond between the thread of the impeller and the thread of the shaft. In this way, a particularly large area for the connection is available so that high durability can be achieved. In addition, the glue used in this manner for the adhesive bond can lubricate the screw connection during the screwing together so that because of the controllable lubricating characteristic an exact tightening torque can be maintained.

A particularly advantageous solution provides that the rotor comprises an adhesive bond between the screwed-in threaded pin and a bottom of the bore.

A further favourable further development of the solution according to the invention provides that the rotor comprises a joining gap, in particular between the shaft and the at least one impeller, for soldering and/or welding and/or adhesive. Through this joining gap, an even and better distribution of the liquid solder, liquid material or liquid glue can be achieved because of the capillary effect.

A particularly favourable further development of the solution according to the invention provides that the joining gap is formed by a shoulder in the contact surface of the at least one impeller and/or by a shoulder in the contact surface of the shaft. In this way, the joining gap is easily accessible for soldering and welding.

A favourable possibility provides that the adhesive bond comprises elastic adhesive. In this way, a vibration transmission between shaft and impeller can be dampened. Thus, the vibrations are also reduced as a whole as a result of which the durability was increased.

A further favourable possibility provides that the adhesive bond comprises adhesive with a heat conductivity that is smaller than the heat conductivity of a material of the shaft or of a material of the at least one impeller. Thus, thermal insulation between the shaft and the at least one impeller can be achieved.

A particularly favourable possibility provides that the adhesive bond comprises adhesive with a heat expansion coefficient which is between the heat expansion coefficients of the shaft and of the at least one impeller. Thus, the adhesive can serves as a buffer for the heat expansion of shaft and impeller.

Furthermore, an advantageous further development of the solution according to the invention provides that the rotor comprises a solder reservoir. Solder is introduced into this solder reservoir during the assembly. Accordingly, no further solder has to be added from the outside during the soldering process.

According to an advantageous further development of the solution according to the invention the rotor comprises a solder reservoir which is formed through the joining gap. Because of this, the solder can be directly introduced at the point at which it is needed for the soldered connection.

A particularly advantageous further development of the solution according to the invention provides that the rotor comprises a solder reservoir which is formed by an annular groove in the contact surface of the at least one impeller and/or by an annular groove in the contact surface of the shaft. In this way, an adequate quantity of solder can be provided which because of the capillary effect can flow into the joining gap.

A favourable further development of the solution according to the invention provides that the rotor comprises a solder reservoir which is formed by a hollow space between the screwed-in threaded pin and a bottom of the bore. Through this formation, the thread is also wetted with solder during the soldering.

A favourable alternative provides that the thread of the shaft or the thread of the impeller comprises at least one groove into which a clamping element can be introduced. When the shaft and the impeller are screwed to one another the clamping element generates additional surface pressure of the two threads. Consequently, the frictional force between the two threads is increased so that the threads are clamped together. Thus, the screw connection is locked against unintentional unscrewing.

A further favourable alternative provides that the groove runs axially or in circumferential direction. The groove consequently runs on the surface of the threaded pin or on the surface of the bore on which the corresponding threads are also arranged. Thus, the clamping element, which is located in the groove, can increase the surface pressure between the threads in order to lock the screw connection against unscrewing.

A particularly favourable alternative provides that the clamping element is formed by a filament which is pressed into the groove. The filament is shorter than the axial length of the groove and has such a cross section that it projects into the thread at any rate so that when the counter thread is screwed on the counter thread has to cut into the filament or has to spatially displace the same. Thus, additional friction between the clamping element and the threads is created on the one hand and the area pressure of the threads against one another on the side located opposite the groove is increased on the other hand. In addition, the filament comprises deformable, in particular elastically or plastically deformable material. The hardness and elasticity of the material determines the clamping effect of the filament.

A further particularly favourable alternative provides that the clamping element is formed by an insert element of solid material. For example, the insert element comprises material that is harder than the material of the filament, in particular the insert element comprises metal such as for example aluminium, steel or titanium. Because of this, higher frictional forces than with the clamping element that is formed by a filament are obtained. Consequently, the clamping effect is significantly increased. The shaft and the impeller are thus thoroughly locked against unscrewing of the screw connection.

An advantageous alternative provides that the thread of the shaft and/or the thread of the impeller comprises a coating. The coating brings about increased surface pressure between the thread of the shaft and the thread of the impeller when the shaft and the impeller are screwed together. Consequently the coating forms a clamped connection for locking the screw connection against unintentional unscrewing.

Alternatively or additionally to this it is mentioned that the coating of the thread can be formed circumferentially or be formed only in regions.

A favourable possibility provides that the coating comprises elastic material. Consequently vibration transmission between shaft and impeller can be dampened. Thus, the vibrations are also reduced as a whole, as a result of which the durability is increased.

A further favourable possibility provides that the coating comprises material with a heat conductivity that is smaller than the heat conductivity of a material of the shaft or of a material of the at least one impeller. Thus, heat insulation between the shaft and the at least one impeller can be achieved.

A particularly favourable possibility provides that the coating comprises material with a heat expansion coefficient that is between the heat expansion coefficients of the shaft and of the at least one impeller. Thus, the coating can serves as buffer for the heat expansion of shaft and impeller.

A further advantageous alternative provides that ceramic crystals are arranged between the thread of the shaft and the thread of the impeller. The crystals cant between the threads so that a frictional force between the threads is increased. Consequently locking of the screw connection between the thread of the shaft and the thread of the impeller is achieved.

The ceramic crystals can for example be arranged between the threads in that prior to the shaft being screwed to the impeller a liquid containing ceramic is applied onto one or both threads. When the liquid dries, the ceramic crystals are formed thus clamping the threads against one another.

Furthermore, a particularly favourable further development of the solution according to the invention provides that the at least one impeller comprises a gamma-TiAl alloy and/or an iron aluminide alloy and/or ceramic. These materials have a particularly favourable strength-weight ratio so that the response behaviour of the supercharging devices can be improved in this way.

Furthermore, the object according to the invention is solved by a supercharging device, in particular an exhaust gas turbocharger, with a housing and a rotor according to the above description. The advantages of the rotor according to the invention are thus transferred to the supercharging device to the above description of which reference is made in this regard.

In addition to this, the object is solved according to the invention by a method for connecting an impeller with a shaft to a rotor according to the above description, wherein prior to the shaft and the impeller being screwed together a solder platelet is inserted into a receiving region, subsequently the impeller and the shaft are screwed together and subsequently the impeller soldered to the shaft by at least local heating of the rotor until the solder platelet melts. Because of this, the process forces that occur during the soldering can be absorbed through the screw connection so that the effort for fixing the shaft and the impeller relative to one another is reduced. Because of the fact that the solder does not have to be added from the outside during the soldering a defined quantity of solder is always available for the soldered connection as a result of which the reproducibility of the soldered connection is improved.

Furthermore, a particularly favourable development of the solution according to the invention provides that the receiving region is formed by a shoulder and a joining section or by an annular groove. Because of this, the position of the solder platelet is defined so that good reproducibility of the soldered connection is ensured.

A further advantageous further development of the solution according to the invention provides that the rotor is soldered through local heating, in the region of the solder platelet, through induction or with a beam, for example laser or electron beam. In this way, the entire component does not have to be heated which on the one hand accelerates the process and energy is thus saved and on the other hand it reduces the distortion of the rotor caused through the heating.

Furthermore, the abovementioned object according to the invention is solved by a method for connecting an impeller with a shaft to a rotor according to the above description, wherein prior to the shaft being screwed to the at least one impeller adhesive is applied onto an adhesive surface and subsequently the at least one impeller and the shaft are screwed together. Because of this, the adhesive can be reproducibly applied as a result of which continuous quality of the adhesive bond is possible.

An advantageous possibility provides that prior to applying the adhesive the adhesive surface is cleaned and/or roughened. Thus, the adhesive effect and thus the holding force of the adhesive bond can be improved.

In addition to this, the abovementioned object is solved according to the invention by a method for connecting an impeller with a shaft to a rotor according to the above description, wherein a clamping element is introduced into at least one groove, which runs in the thread of the shaft or in the thread of the impeller. Because of this, the clamping element can clamp the screw connection once screwed together later on, thus locking the screw connection against unintentional unscrewing.

The abovementioned object according to the invention is solved furthermore by a method for connecting an impeller with a shaft to a rotor according to the above description, wherein prior to the shaft being screwed to the at least one impeller a coating is applied onto the thread of the shaft and/or onto the thread of the impeller. Because of this, the coating, once the shaft is screwed to the impeller, runs between the threads and can thus increase the friction between the threads. In particular, the coating can have higher friction values than the material of the threads. In addition to this, the surface pressure between the threads can be increased through the coating. Consequently, an overall increase of the friction forces locking the screw connection can be achieved.

Furthermore, the abovementioned object according to the invention is solved by a method for connecting an impeller with a shaft to a rotor according to the above description, wherein prior to the shaft being screwed to the at least one impeller the thread of the shaft or the thread of the impeller is wetted with a liquid containing ceramic. Following the screwing of the shaft to the impeller, the liquid dries as a result of which the ceramic contained in the liquid forms crystals or crystals of the ceramic agglomerate. The crystals so created settle into an intermediate space between the threads thus wedging the two threads against one another. Consequently, disconnecting the screw connection is rendered more difficult.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiment of the invention are shown in the drawings and are explained in more detail in the following description, wherein same reference numbers relate to same or similar or functionally same components.

BRIEF DESCRIPTION OF THE DRAWINGS

Here it shows, in each case schematically.

DETAILED DESCRIPTION

Figure 1:
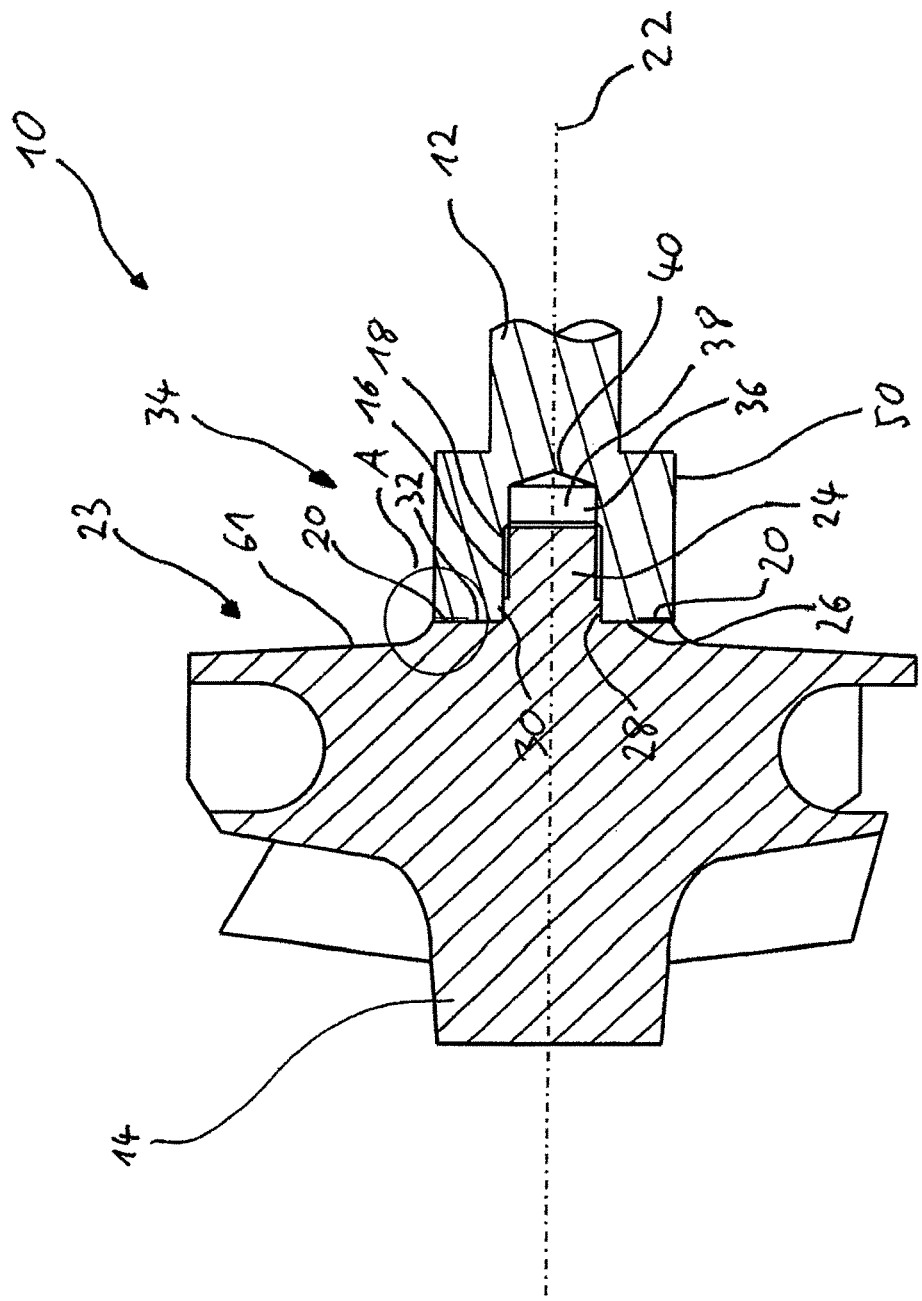
FIG. 1 a sectional representation of a first exemplary embodiment of a rotor according to the invention along an axis of rotation of the rotor, FIG. 2 a sectional representation of a second exemplary embodiment of the rotor according to the invention along an axis of rotation of the rotor, FIGS. 3a-3c an enlarged representation of the region A from FIG. 1 and FIG. 2 for a version each of the first and of the second exemplary embodiment, FIGS. 4a-4c an enlarged representation of the region A from FIG. 1 and FIG. 2 for a version each of the first and of the second exemplary embodiment, FIG. 5 a sectional representation of a third exemplary embodiment of the rotor according to the invention along an axis of rotation of the rotor, FIG. 6 a sectional representation of a first version of a fourth exemplary embodiment of the rotor along an axis of rotation of the rotor, FIG. 7 a sectional representation of a second version of the fourth exemplary embodiment of the rotor along an axis of rotation of the rotor, FIG. 8 a sectional representation of a third version of the fourth exemplary embodiment of the rotor along an axis of rotation of the rotor, FIG. 9 a sectional representation of a fourth version of the fourth exemplary embodiment of the rotor along an axis of rotation of the rotor, FIG. 10 a sectional representation of a sixth exemplary embodiment of the rotor along an axis of rotation, FIG. 11a an enlarged representation of the impeller in the region B from FIG. 10, FIG. 11b an enlarged representation of the region B from FIG. 10, wherein the representation is rotated by 90° compared with FIG. 11a, FIG. 12 an enlarged representation of the shaft in the region B from FIG. 10, and FIG. 13 an enlarged representation of screwed-together thread flanks according to an eighth exemplary embodiment of the rotor 10.
Figure 2:
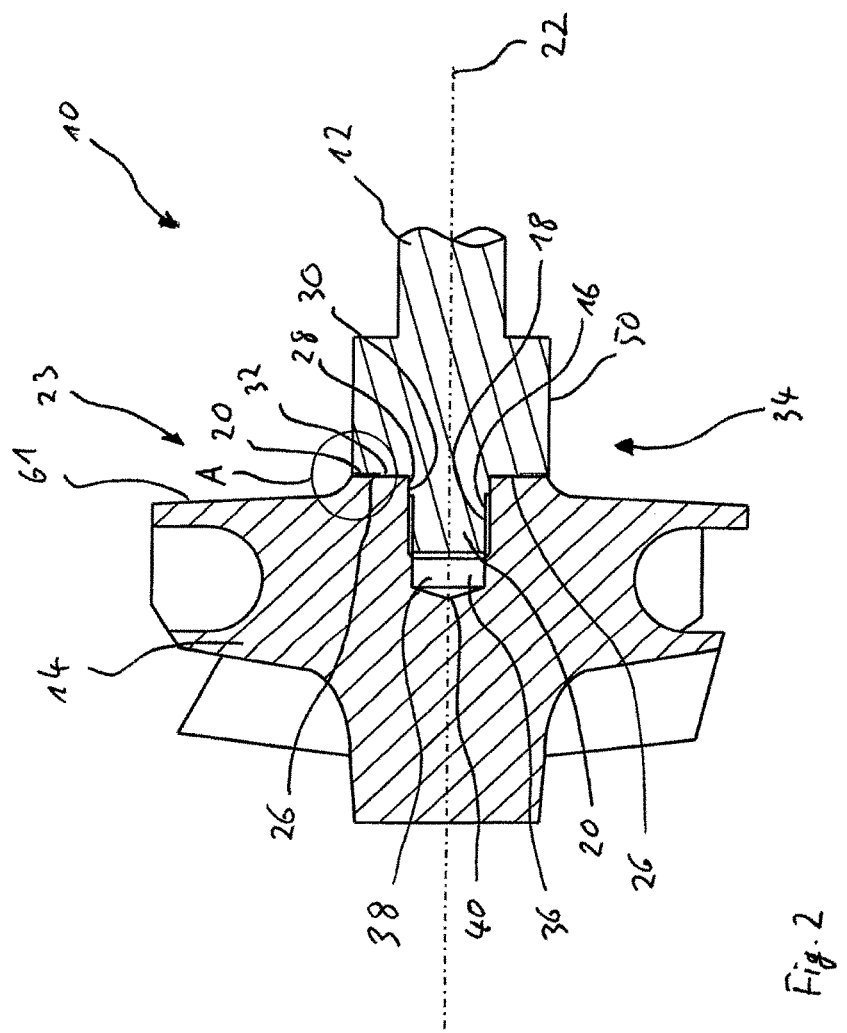

A rotor 10 for a compressor or a turbine, in particular for a supercharging device, for example an exhaust gas turbocharger, is shown in FIG. 1. The rotor 10 comprises a shaft 12 and at least one impeller 14. For use in a supercharging device the rotor 10 comprises multiple for example two impellers 14, wherein one is formed as a turbine wheel and the other one as a compressor wheel and is rotatably mounted about an axis of rotation 22.

At least one impeller 14 and the shaft 12 are screwed to one another by means of two threads 16 and 18. For locking the screw connection, the rotor 10 has a soldered or welded connection 20. The design and connection of the at least one impeller 14 to the shaft 12 according to the invention can be applied to the turbine wheel and/or to the compressor wheel.

On its connecting side 23 facing the shaft 12 the at least one impeller 14 comprises a threaded pin 24, which is coaxially arranged to the axis of rotation 22 and concentrically projects out of a contact surface 26 of the at least one impeller 14. In a front portion the threaded pin 24 comprises the thread 16 and in a rear portion, which adjoins the contact surface 26 of the at least one impeller 14, a centring portion 28. The centring portion 28 of the at least one impeller 14 comprises a fit diameter and together with a centring portion 30 of the shaft 12, which has a fit diameter matched to the centring portion 28, causes radial centring of the at least one impeller 14 relative to the shaft 12.

When the at least one impeller 14 is screwed to the shaft 12 the centring portion 30 of the shaft 12 encloses the centring portion 28 of the at least one impeller 14. Through the fit diameters adapted to one another the radial clearance between the at least one impeller 14 and the shaft 12 is thus minimised.

Furthermore, the at least one impeller 14 adjoining the threaded pin 24 comprises the contact surface 26, which radially extends from the threaded pin 24 to the outside, preferentially extends substantially perpendicularly to the axis of rotation 22 to the outside. When the at least one impeller 14 and the shaft 12 are screwed together the contact surface 26 contacts a contact surface 32 of the shaft 12. Because of the annular contacting distally from the axis enclosing the axis of rotation 22 between rotor 14 and shaft 12, canting between the at least one impeller 14 and the shaft 12 is prevented.

On the connecting side 34 facing the at least one impeller 14, the shaft 12 comprises a bore 36, for example a blind hole bore, in which the thread 18 is formed as an internal thread. The bore 36 and thus also the thread 18 run coaxially to the axis of rotation 22. The depth of the bore 36 is greater than the length of the threaded pin 24. Thus, a hollow space 38 between a bottom 40 of the bore 36 and the threaded pin 24 remains in the screwed-together state. At the inlet of the bore 36 the centring portion 30 of the shaft 12 is arranged, which together with the centring portion 28 of the at least one impeller 14 brings about the radial centring between the at least one impeller 14 and the shaft 12.

The bore 36 is enclosed by the contact surface 32 of the shaft 12. The contact surface 32 of the shaft 12 extends starting out from the bore 36 radially to the outside, preferentially substantially perpendicularly to the axis of rotation 22 radially to the outside. The contact surface 32 comprises two sections, a contact section 42 and a joining section 44 which are separate from one another by a shoulder 46. The contact section 42 extends starting out from the bore 36 as far as to the shoulder 46. In the screwed-together state, the contact section 42 contacts the contact surface 26 of the at least one impeller 14 thus bringing about the stabilisation and fixing against canting of the at least one impeller 14 and of the shaft 12. The joining section 44 extends starting out from the shoulder 46 radially to the outside as far as to an outer surface 50 of the shaft 12 and is set back by the shoulder 46 compared with the contact portion 42 in axial direction from the at least one impeller 14. In this way, a joining gap 48 is formed between the at least one impeller 14 and the shaft 12. The joining gap 48 extends starting out from the shoulder 46 between the joining section 44 of the shaft 12 and of the contact surface 26 of the at least one impeller 14 radially to the outside as far as to the outer surface 50 of the shaft 12.

The joining gap 48 has a width in axial direction that is small enough in order to generate a capillary effect. Consequently, liquid metal such as occurs for example during soldering or welding can be distributed over the entire joining gap 48. In this way a corresponding soldered or welded connection 20 becomes easier to produce since the distribution of the solder or of the liquid metal is ensured through the capillary effect. The joining gap 48 in the case of a soldered connection can also serve as a solder reservoir 52 in that prior to the screwing together of the at least one impeller 14 and the shaft 12 an annular solder platelet 54 is placed in a receiving region 56 formed by shoulder 46 and joining section 44.

The features explained above bring about that the main load of the connection is supported by the threads 16 and 18 as a result of which the soldered or welded connection 20 only has to function as a lock of the screw connection and accordingly can be smaller as a result of which the distortion caused by the soldered or welded connection 20 can be reduced.

In addition to this, the radial centring through the centring portion 28 of the at least one impeller 14 and the centring portion 30 of the shaft 12 bring about that the at least one impeller 14 and the shaft 12 are radially aligned and because of this the unbalance of the rotor 10 is reduced. Furthermore, the contact surface 26 of the at least one impeller 14 and the contact surface 32 of the shaft 12 bring about that the at least one impeller 14 and the shaft 12 do not cant relative to one another as a result of which the unbalance of the rotor 10 can be likewise reduced.

For connecting the shaft 12 and the at least one impeller 14, the following steps are carried out.

Prior to the screwing together of the shaft 12 and of the at least one impeller 14, the solder platelet 54 is placed into the receiving region 56. Following this, the at least one impeller 14 and the shaft 12 are screwed together. When screwing the shaft 12 together with the at least one impeller 14 a prescribed final torque should be maintained. Following the screwing together to the final torque, the soldered platelet 54 is caused to melt. This can be effected for example in that the rotor 10 as a whole is heated in an oven or through local heating of the rotor 10, for example induction or with a beam, for example laser or electron beam.

In this way, the distortion that occurs during soldering can be minimised. Furthermore, this method makes possible using materials which are difficult to weld or not at all, for example an impeller 14 can be used which comprises a gamma-TiAl alloy and/or an iron aluminide alloy and/or ceramic.

Figure 3:
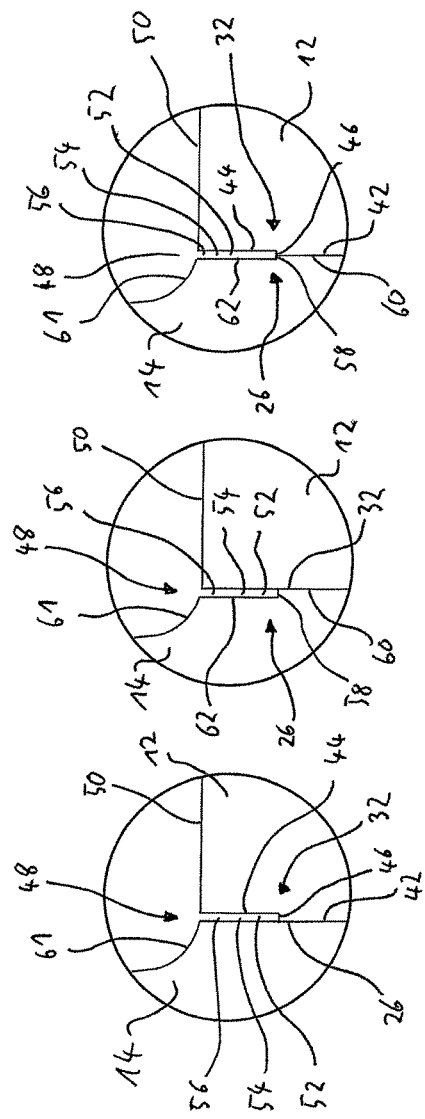

A second version of the first exemplary embodiment shown in the FIGS. 1 and 3b differs from the first version of the first exemplary embodiment shown in the FIGS. 1 and 3a in that the joining gap 48 is formed by a shoulder 58 in the contact surface 26 of the at least one impeller 14 instead of by a shoulder 46 by the contact surface 32 of the shaft 12.

The contact surface 32 of the shaft does not comprise a shoulder 46 and extends from the bore 36 radially to the outside as far as to the outer surface 50 of the shaft 12. The contact surface 26 of the at least one impeller 14 comprises two sections, a contact section 60 and a joining section 62, which are separated from one another by the shoulder 58.

The contact section 60 of the at least one impeller 14 extends starting out from the threaded pin 24 as far as to the shoulder 58. In the screwed-together state, the contact section 60 contacts the contact surface 32 of the shaft 12 and thus brings about stabilisation and fixing against canting of the at least one impeller 14 and the shaft 12. Starting out from the shoulder 58 radially to the outside the joining section 62 extends as far as to an outer surface 61 of the at least one impeller 14 and is set back by the shoulder 58 from the shaft 12 in axial direction compared with the contact section 60. In this way, a joining gap 48 is formed between the at least one impeller 14 and the shaft 12. The joining gap extends starting out from the shoulder 58 between the joining section 62 and the contact surface 32 of the shaft 12 radially to the outside.

Otherwise, the second version of the first exemplary embodiment of the rotor 10 shown in the FIGS. 1 and 3b corresponds with respect to construction and function with the first version of the first exemplary embodiment shown in the FIGS. 1 and 3a, to the above description of which reference is made in this regard.

A third version of the first exemplary embodiment of the rotor 10 shown in the FIGS. 1 and 3c differs from the first version of the first exemplary embodiment shown in the FIGS. 1 and 3a in that the joining gap 48 is formed both by a shoulder 46 in the contact surface 32 of the shaft 12 and also by a shoulder 58 in the contact surface 26 of the at least one impeller 14. The contact surface 26 of the at least one impeller 14 comprises two sections, a contact section 60 and a joining section 62, which are separated from one another by the shoulder 58.

The contact section 60 of the at least one impeller 14 extends starting out from the threaded pin 24 as to the shoulder 58. In the screwed-together state, the contact section 60 contacts the contact section 42 of the shaft 12 and thus brings about stabilisation and fixing against canting of the at least one impeller 14 and of the shaft 12. The joining section 62 extends starting out from the shoulder 58 radially to the outside and is set back by the shoulder 58 from the shaft in axial direction of the shaft 12 compared with the contact section 60. In this way, a joining gap 48 is formed between the at least one impeller 14 and the shaft 12. The joining gap 48 extends starting out from the shoulder 58 radially to the outside starting out between the joining section 62 of the at least one impeller 14 and the joining section 44 of the shaft 12.

Otherwise, the third version of the first exemplary embodiment of the rotor 10 shown in the FIGS. 1 and 3c corresponds with respect to construction and function to the first version of the first exemplary embodiment shown in the FIGS. 1 and 3a, to the above description of which reference is made in this regard.

Figure 4:
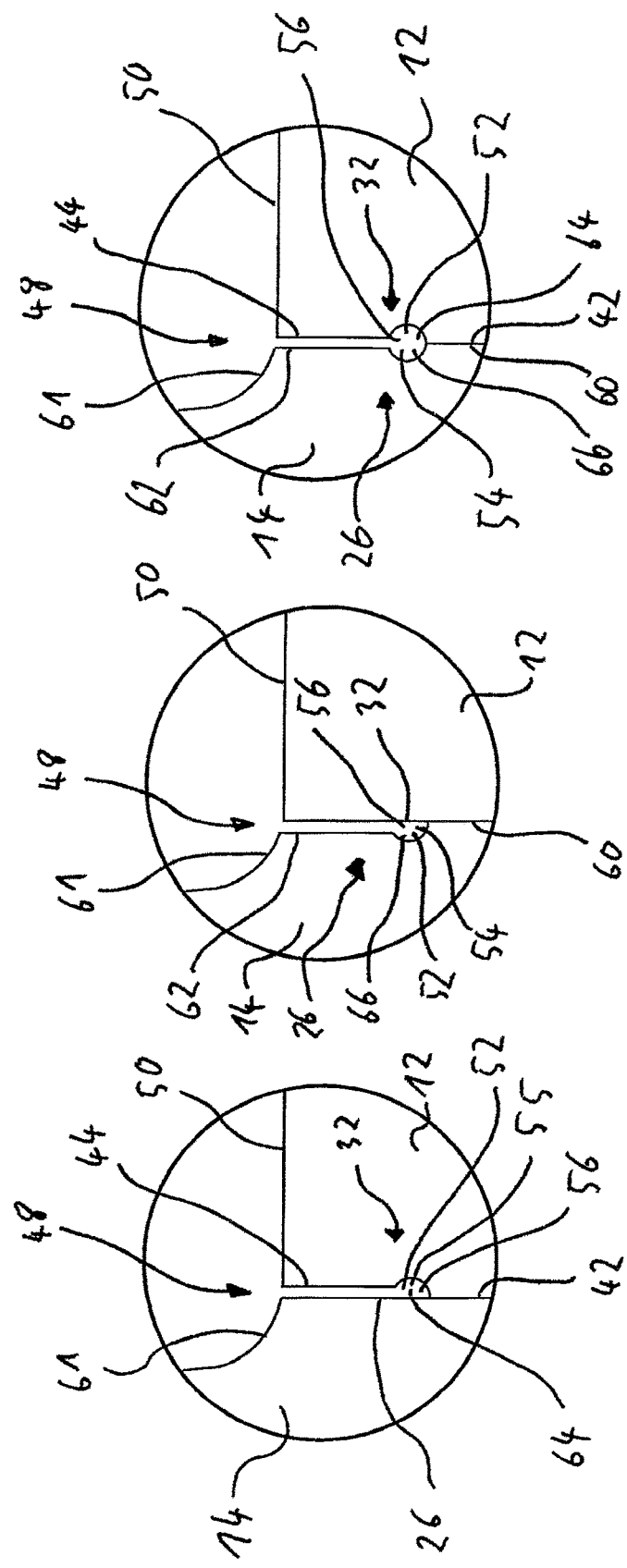

A fourth version of the first exemplary embodiment of the rotor 10 shown in the FIGS. 1 and 4a differs from the first version of the exemplary embodiment of the rotor 10 shown in the FIGS. 1 and 3a in that the contact surface 32 of the shaft 12 instead of the shoulder 46 comprises an annular groove 64, which forms the solder reservoir 52.

Preferentially, the annular groove 64 runs in the contact surface 32 of the shaft 12 coaxially to the axis of rotation 22. Furthermore, the annular groove 64 forms the receiving region 56 in the contact surface 32 of the shaft 12, into which the soldered platelet 54 is placed before the screwing together of the at least one impeller 14 and the shaft 12. The contact surface comprises two sections, a contact section 42 and a joining section 44, which are separated from one another by the annular groove 64.

The contact section 42 extends starting out from the bore 36 as far as to the annular groove 64. In the screwed-together state the contact section 42 contacts the contact surface 26 of the at least one impeller 14 and thus brings about stabilisation and fixing against canting of the at least one impeller 14 and of the shaft 12.

The joining section 44 extends starting out from the annular groove 64 radially to the outside as far as to an outer surface 50 of the shaft 12 and compared with the contact portion 42 is set back from the at least one impeller 14 in axial direction. In this way, a joining gap 48 is formed between the at least one impeller 14 and the shaft 12. The joining gap 48 extends starting out from the annular groove 64 between the joining section 44 and the contact surface 26 of the at least one impeller 14 radially to the outside as far as to the outer surface 50 of the shaft 12.

Otherwise, the fourth version of the first exemplary embodiment of the rotor 10 shown in the FIGS. 1 and 4a corresponds with respect to construction and function to the first version of the first exemplary embodiment shown in the FIGS. 1 and 3a, to the above description of which reference is made in this regard.

A fifth version of the first exemplary embodiment of the rotor 10 shown in the FIGS. 1 and 4b differs from the second version of the exemplary embodiment of the rotor 10 shown in the FIGS. 1 and 3b in that the contact surface 26 of the at least one impeller 14 instead of the shoulder 58 comprises an annular groove 66, which forms the solder reservoir 52. Preferentially, the annular groove 66 runs in the contact surface 26 of the at least one impeller 14 coaxially to the axis of rotation 22. Furthermore, the annular groove 66 forms the receiving region 56 in the contact surface 26 of the at least one impeller 14, into which the solder platelet 54 is placed prior to the screwing together of the at least one impeller 14 and of the shaft 12.

The contact surface 26 comprises two sections, a contact section 60 and a joining section 62, which are separated from one another by the annular groove 66. The contact section 60 extends starting out from the threaded pin 24 as far as to the annular groove 66. In the screwed-together state the contact section 60 contacts the contact surface 32 of the shaft 12 and thus brings about stabilisation and fixing against canting of the at least one impeller 14 and of the shaft 12.

The joining section 62 extends starting out from the annular groove 66 radially to the outside as far as to an outer surface 61 of the at least one impeller 14 and compared with the contact section 60 is set back from the shaft in axial direction. In this way, a joining gap 48 between the at least one impeller 14 and the shaft 12 is formed. The joining gap 48 extends starting out from the annular groove 66 between the joining section 62 and the contact surface 32 of the shaft 12 radially to the outside.

Otherwise, the fifth version of the first exemplary embodiment of the rotor 10 shown in the FIGS. 1 and 4b corresponds with respect to construction and function to the second version of the first exemplary embodiment shown in the FIGS. 1 and 3b, to the above description of which reference is made in this regard.

A sixth version of the first exemplary embodiment of the rotor 10 shown in the FIGS. 1 and 4c differs from the third version of the first exemplary embodiment of the rotor 10 shown in the FIGS. 1 and 3c in that the contact surface 26 of the at least one impeller 14 comprises an annular groove 66 instead of the shoulder 58 and in that the contact surface 32 of the shaft 12 comprises an annular groove 64 instead of the shoulder 46.

Preferentially, the annular groove 64 runs in the contact surface 32 of the shaft 12 and the annular groove 66 in the contact surface 26 of the at least one impeller 14 coaxially to the axis of rotation 22. Furthermore, the annular groove 64 in the contact surface 32 of the shaft 12 and the annular groove 66 in the contact surface 26 of the at least one impeller 14 form the receiving region 56, into which the solder platelet 54 is placed prior to the screwing-together of the at least one impeller 14 and of the shaft 12. The annular groove 64 in the contact surface 32 of the shaft 12 and the annular groove 66 in the contact surface 26 of the at least one impeller 14 together form the solder reservoir 52.

Otherwise, the sixth version of the first exemplary embodiment of the rotor 10 shown in the FIGS. 1 and 4c corresponds with respect to construction and function to the third version of the first exemplary embodiment shown in the FIGS. 1 and 3c, to the above description of which reference is made in this regard.

A second exemplary embodiment of the rotor 10 shown in the FIGS. 2, 3a-3c and 4a-4c differs from the first exemplary embodiment of the rotor 10 shown in the FIGS. 1, 3a-3c and 4a-4c in that the bore 36 and the threaded pin 24 are switched with respect to one another with the corresponding centring portions 28 and 30. Accordingly, the at least one impeller 14 comprises the bore 36 in which the thread 16 is formed as internal thread and the shaft 12 comprises the threaded pin 24, on which the thread 18 is formed as external thread.

The versions described with respect to the first exemplary embodiment of the rotor 10 can be applied to the second exemplary embodiment of the rotor 10 accordingly.

Otherwise, the second exemplary embodiment of the rotor 10 shown in the FIGS. 2, 3a-3c and 4a-4c corresponds with respect to construction and function to the first exemplary embodiment of the rotor 10 shown in the FIGS. 1 and 3a-3c and 4a-4c, to the description of which reference is made to this regard.

Figure 5:
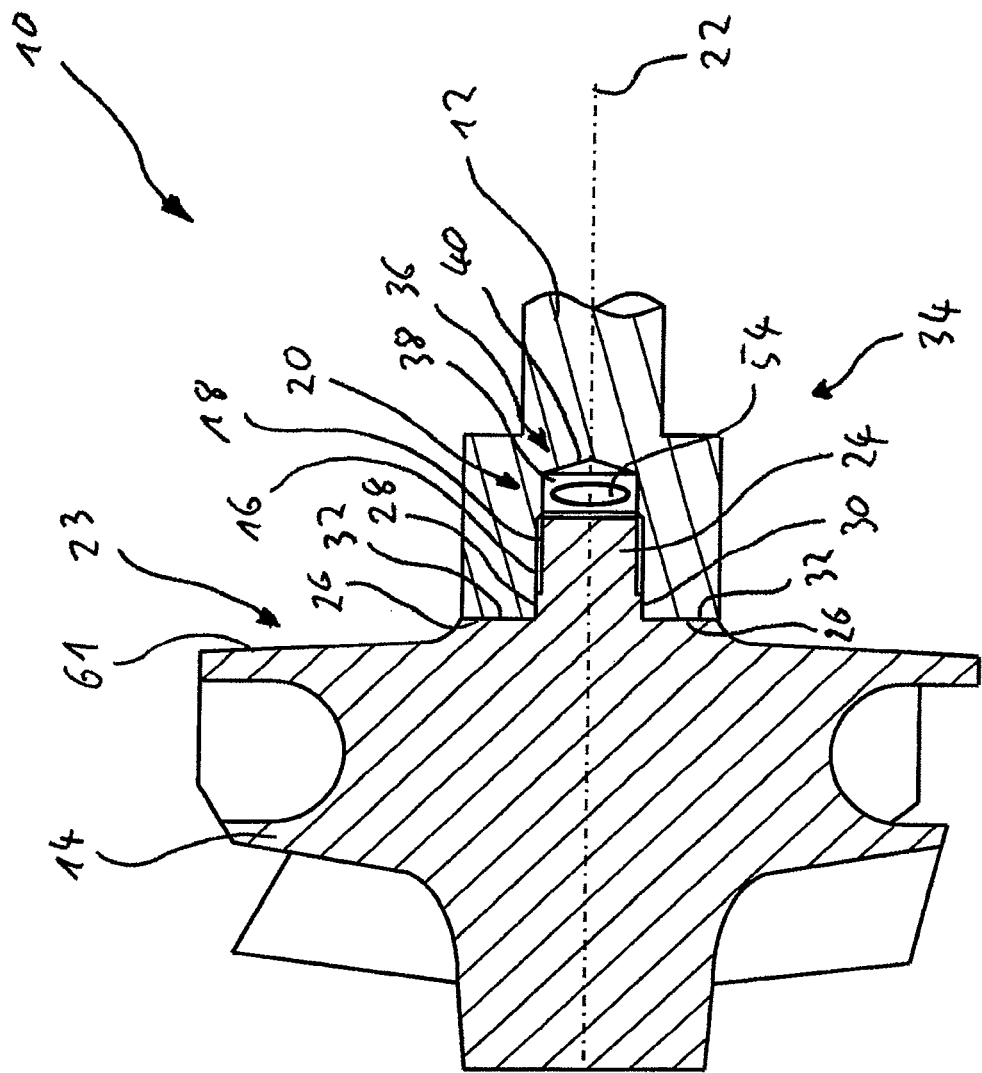

A third exemplary embodiment of the rotor 10 shown in FIG. 5 differs from the first exemplary embodiment of the rotor 10 shown in FIGS. 1, 3a-3c and 4a-4c in that the contact surface 32 of the shaft 12 does not comprise a shoulder 46 and in that the solder reservoir 52 is arranged in the hollow space 38 between the bottom 40 of the bore 36 and the threaded pin 14.

Because of the fact that the solder platelet 54 is arranged in the hollow space 38 the liquid solder during soldering wets both the threads 16 and 18 as well as the contact surface 26 and 32.

Otherwise, the third exemplary embodiment of the rotor 10 shown in FIG. 5 corresponds with respect to construction and function to the first exemplary embodiment of the rotor 10 shown in the FIGS. 1, 3a-3c and 4a-4c, to the description of which reference is made in this regard.

A fourth exemplary embodiment of the rotor 10 shown in the FIGS. 6 to 9 differs from the first version of the first exemplary embodiment of the rotor 10 shown in the FIGS. 1 and 3a in that the contact surface 32 of the shaft 12 does not have a shoulder 46, the shoulder 10 does not have a solder reservoir and in that the rotor 10 comprises a adhesive bond 17 between the shaft 12 and the impeller 14.

Figure 6:
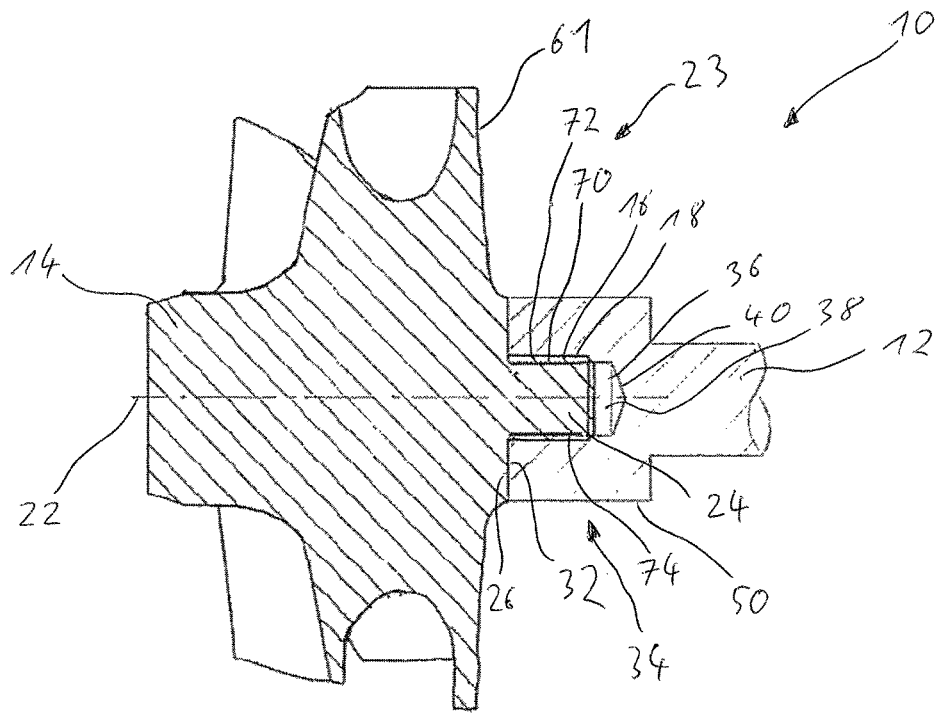

In a first version of the fourth exemplary embodiment of the rotor 10 shown in FIG. 6, the adhesive bond 70 is formed between the thread 16 of the at least one impeller 14 and the thread 18 of the shaft 12. This means that adhesive surfaces 72 of the adhesive bond 70, onto which adhesive 74 is applied or which come into contact with adhesive 74, are arranged on the thread 16 of the impeller 14 and on the thread 18 of the shaft 12. Here, the adhesive bond 70 can be formed annularly closed. Alternatively to this, the adhesive bond 70 can also be formed only in regions or punctiformly, when the glue 74 is only applied to the adhesive surfaces 72 punctiformly or in regions.

For the adhesive bond 70, all types of adhesives which fulfil the temperature requirements for use in a supercharging device are possible in principle. In particular, adhesives in the form of pastes, liquids, gels, granulates, foams, micro-encapsulations are possible. Owing to the temperature requirements, organic adhesives are particularly favourable.

The adhesive bond 70 brings about locking the screw connection between the shaft 12 and the impeller 14, which carries the main load. Thus, heat-introducing methods such as for example soldering or welding can be omitted so that no heating of the rotor 10 or only to a minor degree is necessary. Consequently, the crack formation due to stresses caused by temperature differences can be avoided.

In order to achieve vibration damping, a soft and/or elastic adhesive can be used for example which, in particular, is softer and/or more elastic than the material of the shaft 12 and the material of the impeller. Thus, the adhesive bond forms an elastic intermediate layer between the shaft 12 and the impeller 14, which transmits vibrations purely.

Furthermore, the adhesive 74 can comprise a material which has a low heat conductivity in particular a heat conductivity that is smaller than the heat conductivity of the shaft 12 or of the impeller 14.

In addition to this it can be provided that a heat expansion of the adhesive 74 is selected in such a manner that it is between a heat expansion of the shaft 12 and a heat expansion of the impeller 14. Thus, the adhesive layer 70 forms a buffer for the heat expansion between the shaft 12 and the impeller 14.

Figure 7:
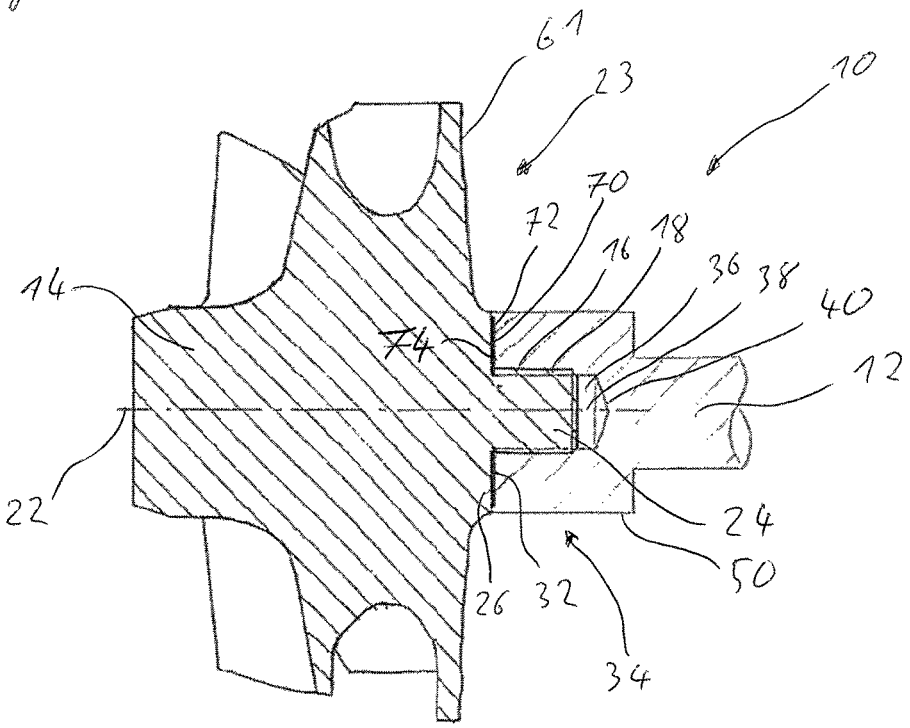

In a second version of the fourth exemplary embodiment of the rotor 10 shown in FIG. 7, the adhesive bond 70 is formed between the contact surface 26 of the impeller 14 and of the contact surface 32 of the shaft 12. The contact surface 26 of the impeller 14 and the contact surface 32 of the shaft 12 carry the adhesive surfaces 72 of the adhesive bond 70. Because of this, the thread 16 of the impeller 14 and the thread 18 of the shaft 12 can be sealed towards the outside in the case of an annular design of the adhesive bond 70. Thus the risk of corrosion is reduced. Alternatively, the adhesive bond 70 can only be formed in regions or in a punctiformly.

Figure 8:
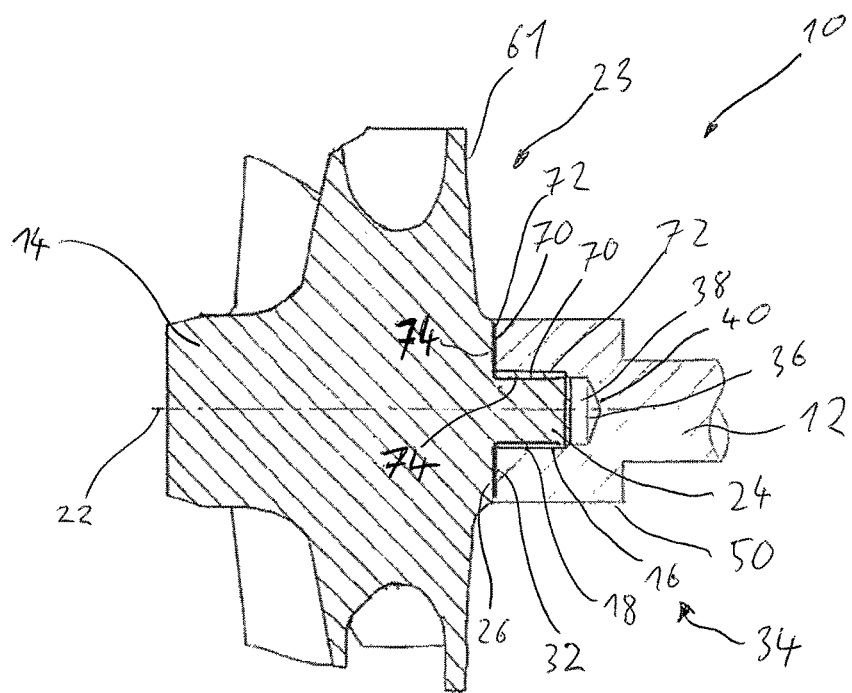

In a third version of the fourth exemplary embodiment of the rotor 10 shown in FIG. 8, the adhesive bond 70 is formed between the thread 16 of the at least one impeller 14 and the thread 18 of the shaft 12 and additionally between the contact surface 26 of the impeller 14 and the contact surface 32 of the shaft 12. Because of this, a greater strength of the adhesive bond 70 is achieved on the one hand and on the other hand, in the case of an annular design of the adhesive bond 70, the thread 16 of the impeller 14 and the thread 18 of the shaft 12 can be sealed off towards the outside. Thus the risk of corrosion is reduced. Alternatively, the adhesive bond 70 can also be formed only in regions or punctiformly.

Figure 9:
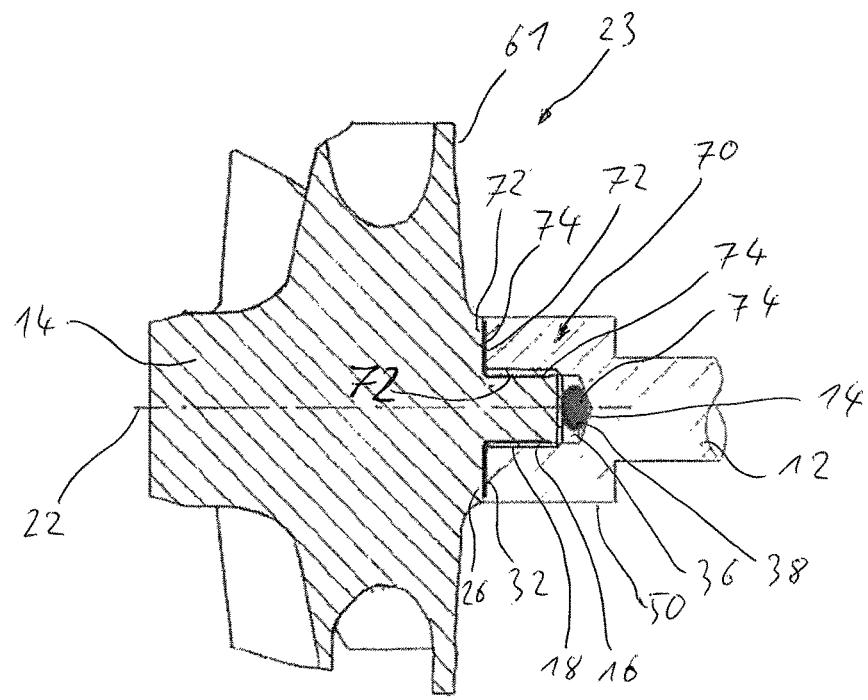

The fourth version of the fourth exemplary embodiment of the rotor 10 shown in FIG. 9 the adhesive bond 70 is additionally formed between the threaded pin 24 and the bottom 40 of the bore 36. To this end, the adhesive 74 is introduced in the hollow space 38 prior to screwing the shaft 12 and the impeller 14 together. The adhesive 74 that is in the hollow space 38 is partially pressed out of the hollow space 38 when the impeller 14 is screwed in and then wets the threads 16 and 18.

For connecting the shaft 12 and the at least one impeller 14, the following steps are carried out.

Prior to screwing the shaft 12 and the at least one impeller 14 together, the adhesive surfaces 72, with which the adhesive 74 is to come into contact is cleaned. In particular, the threads 16 and 18 are cleaned of dirt and liquids such as for example oils. In this way, good adhesion of the adhesive 74 on the adhesive surfaces 72 can be made possible. Consequently, the holding force of the adhesive bond 70 is thus increased.

To further improve the adhesive bond 70, it can be provided prior to the cleaning of the adhesive surfaces 72 that the adhesive surfaces 72 are roughened.

Because of this, the surface of the adhesive surfaces 72 is enlarged so that the adhesion of the adhesive 74 on the adhesive surfaces 72 is likewise enlarged. Roughening the adhesive surfaces 72 can for example take place even during the production of the shaft 12 and of the impeller 14.

Following the cleaning of the adhesive surfaces 72 the adhesive 74 is applied onto the adhesive surfaces 72. Following this, the impeller 14 and the shaft 12 are screwed together. When screwing the shaft 12 to the impeller 14, a prescribed final torque should be maintained. Finally, the adhesive 74 has to set.

Otherwise, the fourth exemplary embodiment of the rotor 10 shown in the FIGS. 6 to 8 corresponds to the first version of the first exemplary embodiment of the rotor 10 with regard to construction and function, to the above description of which reference is made in this regard.

A fifth exemplary embodiment of the rotor 10 which is not shown differs from the fourth exemplary embodiment of the rotor 10 shown in the FIGS. 6 to 8 in that the bore 36 and the threaded pin 24 are switched relative to one another. Thus, the at least one impeller 14 comprises the bore 36 in which the thread 16 is formed as an internal thread and the shaft 12 comprises the threaded pin 24, on which the thread 18 is formed as external thread.

Otherwise the fifth exemplary embodiment of the rotor 10 corresponds to the fourth exemplary embodiment of the rotor 10 shown in the FIGS. 6 to 8 with respect to construction and function, to the above description of which reference is made in this regard.

The shaft 12 and the impeller 14, according to the first and the second exemplary embodiment, can likewise be locked against unscrewing by means of an adhesive bond 70. To this end, the adhesive 74 instead of a solder platelet is introduced into the receiving region 56. The joining gap 48 then extends between the two adhesive surfaces 72 and thus determines a layer thickness of the adhesive 74 in the adhesive bond 70. The layer thickness of the adhesive 74 can thus be adapted to the respective adhesive 74 employed.

Figure 10:
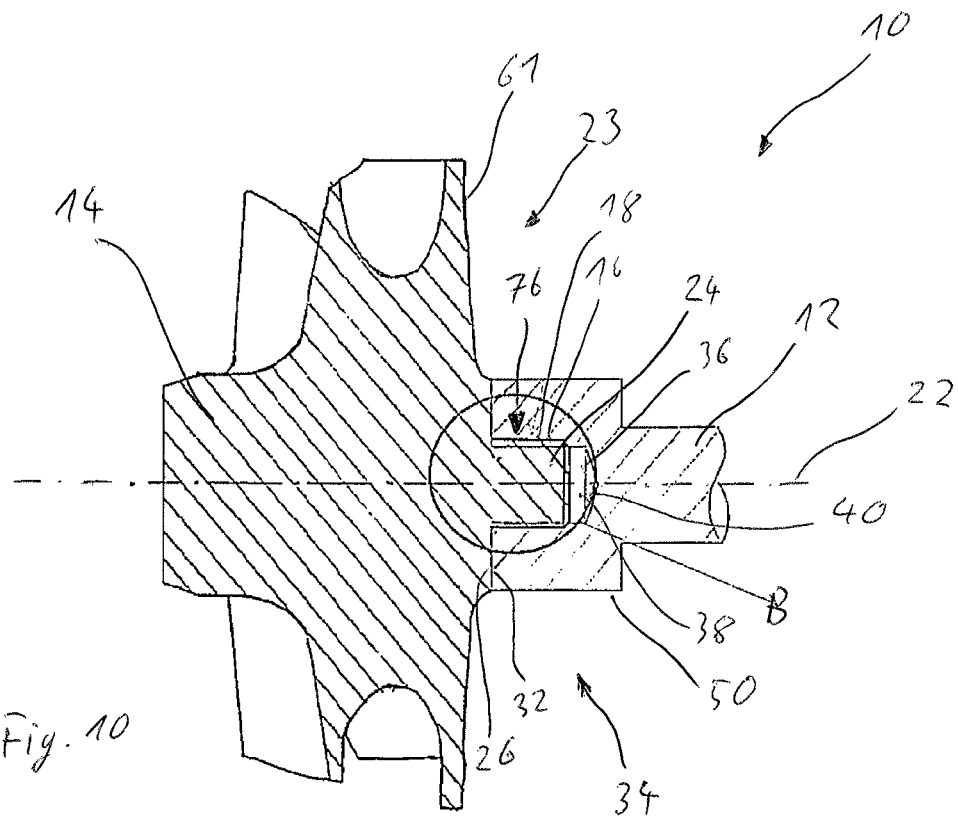
Figure 11A:
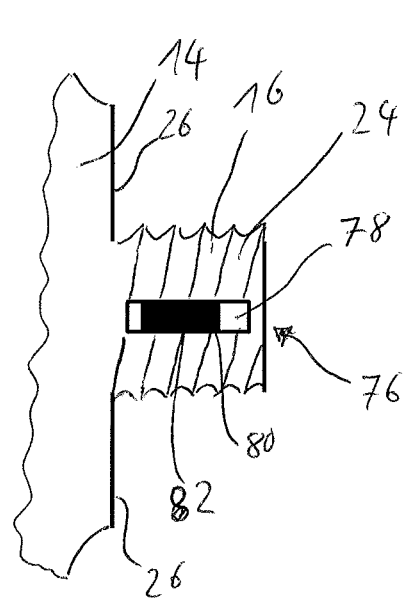
Figure 11B:
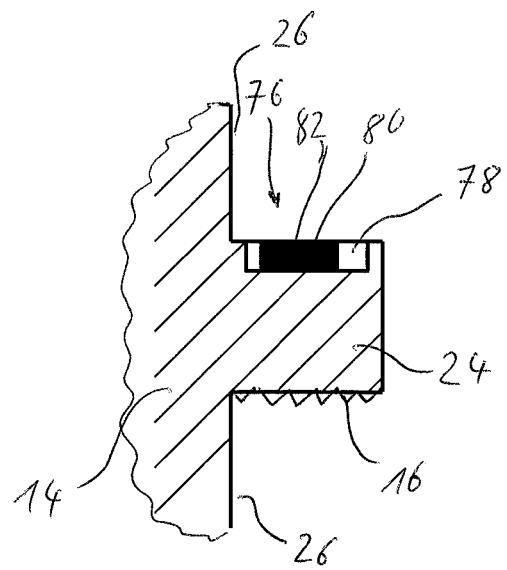
Figure 12:
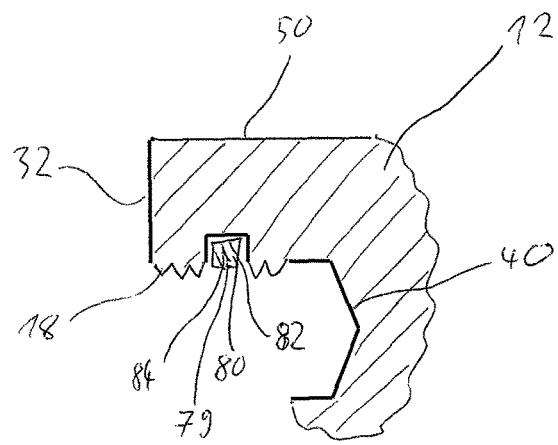

A sixth exemplary embodiment of the rotor 10 shown in the FIGS. 10 to 12 differs from the fourth exemplary embodiment of the rotor 10 shown in the FIGS. 6 to 9 in that the rotor 10 instead of an adhesive bond 70 comprises a clamped connection 76.

On its outer surface carrying the thread 16 the threaded pin 24 comprises an axial groove 78. Alternatively or additionally to this, the axial groove 78 can be arranged on the bore 36. The axial groove 78 interrupts the thread 16 or the thread 18 depending on where the axial groove 78 is arranged, in circumferential direction.

In the axial groove 78, a clamping element 79, for example a filament 80, is introduced. Here, the filament 80 protrudes into a radial region in which the thread 16 of the threaded pin 24 runs. Consequently, the filament 80 comes into contact with the thread 18 when the shaft 12 is screwed to the impeller 14. The filament 80 comprises a deformable material. In particular, the material of the filament 80 is softer than the material of the shaft 12 and/or than the material of the impeller 14. Thus, the filament 80 when the shaft 12 is screwed to the impeller 14 will give way through elastic or plastic deformation. For example, the thread 18, into which no axial groove 78 is introduced, will cut into the clamping element 79 or spatially displaced the same. This creates an intense frictional force which locks the screw connection against unscrewing.

Furthermore, the filament 80 can be pressed further into the axial groove 78 by the thread 18 so that the filament 80 presses against the respective other thread 16 or 18. Because of this, the two threads 16 and 18 are additionally braced against one another so that the frictional force locking the screw connection is increased. Disconnecting the screw connection is thus rendered more difficult.

Alternatively or additionally to this, the clamping element 79 can be formed by an insert element 82, which is designed solidly. The insert element is pressed into the axial groove 78 in order to clamp the screw connection together. The insert element 82 is less elastic than the filament 80. On the one hand, the insert element 82 is less elastic since it is formed solidly. On the other hand, the insert element 82 can be less elastic than the filament 80 in that the insert element 82 comprises a material that is harder than the material of the filament 80. For example, the insert element 82 comprises metal, in particular aluminium, steel and/or titanium.

Consequently, the frictional force achieved through the cutting of the thread 16 or 18 into the insert element 82 is greater than the frictional force through the cutting of the thread 16 or 18 into the filament 80. Furthermore, the force with which the insert element 82 presses against the respective other thread 16 or 18 is greater than the force with which the filament 80 would press against the respective other thread 16 or 18. Thus, the locking effect is again increased through the insert element 82.

In order to facilitate screwing the shaft 12 to the impeller 14 the clamping element 79 does not extend as far as to a tip of the threaded pin 24 or as far as to the contact surface 32 of the shaft 12. Because of this, the threads 16 and 18 can be screwed together at the start without any action on the part of the clamping element 79. The insert element 82 acts on the screw connection only during the course of the screwing-together. Because of this, screwing the shaft 12 to the impeller 14 is facilitated.

A further version of the sixth exemplary embodiment of the rotor 10 shown in FIG. 12 comprises instead of the axial groove 78 a groove 84 extending in circumferential direction. The groove 84 extending in circumferential direction can be formed both on the threaded pin 24 and also on the bore 36.

If the clamping element 79 is formed by an insert element 82 the insert element 82 is preferentially formed by one or multiple circular segments, for example by a slotted ring. An annular insert element would be possible when the insert element 82 comprises a soft, in particular plastic or elastic material.

Otherwise, the sixth exemplary embodiment of the rotor 10 shown in the FIGS. 10 to 12 corresponds with the fourth exemplary embodiment of the rotor 10 shown in the FIGS. 6 to 9 with respect to construction and function, to the above description of which reference is made in this regard.

A seventh exemplary embodiment of the rotor 10 which is not shown differs from the sixth exemplary embodiment of the rotor shown in the FIGS. 10 to 12 in that the rotor 10 comprises no axial groove 78 and no groove 84 extending in circumferential direction and the clamping connection 76 is brought about by a coating applied onto the thread 18 of the shaft and/or onto the thread 16 of the impeller 14.

Prior to screwing the shaft 12 to the impeller 14, one or both of the threads 16 and 18 are provided with a coating. The coating in this case can cover the thread 16 or 18 completely or partially. When using a liquid for coating the thread 16 or 18 the thread can be dipped into the liquid so that a closed coating in circumferential direction can be formed.

Following the screwing of the shaft 12 to the impeller 14 the coating is present between the thread 18 of the shaft 12 and the thread 16 of the impeller 14. This increases a surface pressure between the two threads 16 and 18 so that the holding frictional force is increased. Thus, the screw connection is also locked against unintentional unscrewing.

In order to further increase the achievable surface pressure it can be provided that for the coating a material that can swell up is selected. Thus, the coating can be brought to swell up once the shaft is screwed to the impeller as a result of which the surface pressure between the two threads 16 and 18 increases. Because of this, disconnecting the screw connection is significantly more difficult than screwing together the screw connection.

Depending on the material of the layer, the layer can additionally bring about vibration damping, heat insulation and/or buffering of the heat expansion between the shaft 12 and the impeller 14.

Otherwise, the seventh exemplary embodiment of the rotor 10 corresponds with the sixth exemplary embodiment of the rotor 10 shown in the FIGS. 10 to 12 with respect to construction and function, to the above description of which reference is made in this regard.

Figure 13:
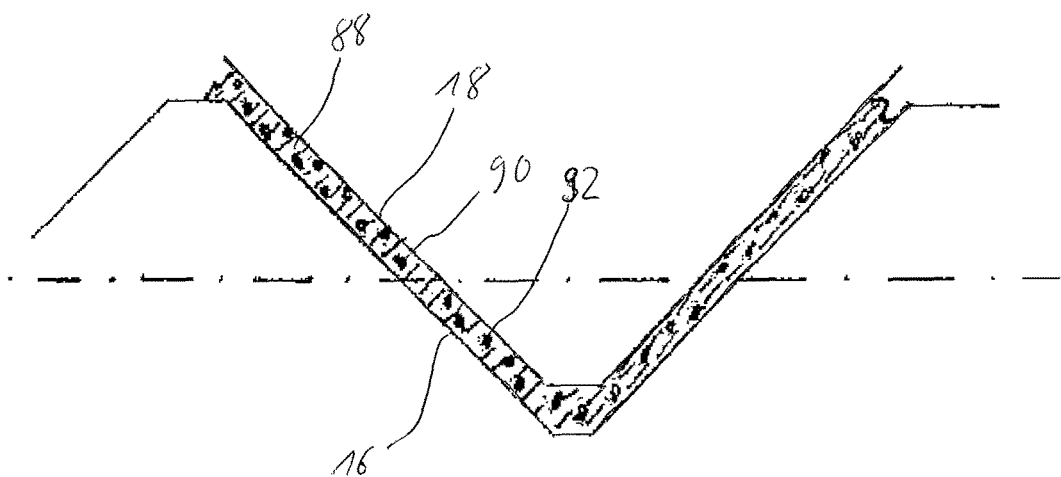

An eight exemplary embodiment of the rotor 10 shown in FIG. 13 differs from the sixth exemplary embodiment of the rotor 10 shown in the FIGS. 10 to 12 in that the rotor 10 does not comprise an axial groove 78 and no groove 84 extending in circumferential direction and the clamping connection 76 is formed by a crystallization connection 86.

The crystallization connection 86 is achieved in that prior to screwing the shaft 12 to the impeller 14 a liquid 88, which contains ceramic 90, is applied onto one of the threads 16 or 18. Preferentially, the liquid 88 has a low viscosity so that the liquid 88 also reaches very fine structures of the thread 16 and 18.

Following this, the shaft 12 and the impeller 14 are screwed together. Following the screwing-together the liquid 88 is evaporates, for example by waiting or by a slight increase in temperature. By evaporating the liquid 88 the ceramic 90 crystallizes out thus forming ceramic crystals 92. If the ceramic 90 is not dissolved in the liquid 88 but is present as dispersion, the ceramic crystals 92 that are present in the dispersion agglomerate thus forming larger ceramic crystals 92.

The ceramic crystals 92 so formed are wedged into an intermediate space between the threads 16, 18. Because of this, the friction between the two threads is increased and the screw connection thus locked against unintentional unscrewing.

Otherwise, the eighth exemplary embodiment of the rotor 10 shown in FIG. 13 corresponds with the sixth exemplary embodiment of the rotor 10 shown in the FIGS. 10 to 12 with respect to construction and function, to the above description of which reference is made in this regard.

The invention claimed is:

1. A rotor for at least one of a turbine and a compressor of a supercharging device, comprising:
   a shaft defining an axis of rotation and at least one impeller;
   the at least one impeller including a thread arranged coaxially to the axis of rotation;
   the shaft including a complementary thread arranged coaxially to the axis of rotation;

the shaft and the at least one impeller being secured together via the respective threads; and wherein the shaft and the at least one impeller are fixed with respect to one another via at least one of a soldered connection, a welded connection, an adhesive bond, a clamped connection and a crystallization connection, and wherein a joining gap is disposed between the shaft and the at least one impeller for at least one of soldering, welding and an adhesive.

2. The rotor according to claim 1, wherein:
the at least one impeller includes one of a threaded pin having an external thread and a bore having an internal thread; and
the shaft includes the other of the threaded pin having the external thread and the bore having the internal thread.

3. The rotor according to claim 1, wherein the shaft further includes a first contact surface and the at least one impeller further includes a second contact surface, wherein the first contact surface of the shaft and the second contact surface of the at least one impeller contact one another at least partially in an assembled state.

4. The rotor according to claim 3, wherein the second contact surface of the at least one impeller and the first contact surface of the shaft are fixed via at least one of the soldered connection, the welded connection and the adhesive bond.

5. The rotor according to claim 3, further comprising a solder reservoir defined by at least one of a second annular groove in the second contact surface of the at least one impeller and a first annular groove in the first contact surface of the shaft.

6. The rotor according to claim 1, wherein the at least one impeller and the shaft are fixed at the joining gap via at least one of the soldered connection, the welded connection and the adhesive bond.

7. The rotor according to claim 1, wherein the joining gap extends in a radial direction of the axis of rotation between the shaft and the at least one impeller.

8. The rotor according to claim 1, wherein the joining gap is defined by at least one of a second shoulder in a second contact surface of the at least one impeller and a first shoulder in a first contact surface of the shaft.

9. The rotor according to claim 1, further comprising a solder reservoir disposed between the shaft and the at least one impeller.

10. The rotor according to claim 1, wherein the joining gap defines a solder reservoir.

11. The rotor according to claim 1, wherein the adhesive bond is composed of an elastic adhesive.

12. The rotor according to claim 1, wherein the adhesive bond includes an adhesive with a heat conductivity that is smaller than at least one of a heat conductivity of a material of the shaft and a heat conductivity of a material of the at least one impeller.

13. The rotor according to claim 1, wherein the adhesive bond includes an adhesive with a heat expansion coefficient that is between a heat expansion coefficient of the shaft and a heat expansion coefficient of the at least one impeller.

14. The rotor according to claim 1, wherein the at least one impeller is composed of at least one of a gamma-TiAl alloy, an iron aluminide alloy and a ceramic.

15. A supercharging device, comprising: a housing and a rotor arranged therein, the rotor including:
a shaft defining an axis of rotation and at least one impeller, the shaft including a first thread arranged coaxially to the axis of rotation and the at least one impeller including a complementary second thread arranged coaxially to the axis of rotation, wherein one of the first thread and the second thread includes an external thread arranged on a threaded pin and the other of the first thread and the second thread includes an internal thread arranged in a bore, wherein the first thread of the shaft is secured to the second thread of the impeller;
a first contact surface arranged on the shaft at least partially contacting a second contact surface arranged on the at least one impeller; and
a solder reservoir arranged between the first contact surface of the shaft and the second contact surface of the at least one impeller, wherein the solder reservoir is defined by at least one of a first annular groove in the first contact surface and a second annular groove in the second contact surface, wherein the first contact surface is fixedly secured to the second contact surface via at least one of a welded connection, a soldered connection and an adhesive connection.

16. A method for producing a rotor of a supercharging device, comprising:
providing a shaft defining an axis of rotation and at least one impeller;
forming a first thread on the shaft coaxially to the axis of rotation and a second thread on the at least one impeller coaxially to the axis of rotation, wherein one of the first thread and the second thread includes an external thread arranged on a threaded pin and the other of the first thread and the second thread includes an internal thread arranged in a bore;
screwing the first thread of the shaft together with the second thread of the at least one impeller;
wherein prior to screwing the first thread of shaft together with the second thread of the at least one impeller, the method includes at least one of the following steps:
(i) inserting a solder platelet into a receiving region formed between a first contact surface of the shaft and a second contact surface of the at least one impeller and melting the solder platelet to connect the first contact surface with the second contact surface via at least a local heating in a region of the solder platelet;
(ii) applying an adhesive to an adhesive surface disposed on at least one of the first thread of the shaft and the second thread of the at least one impeller;
(iii) introducing a clamping element into at least one groove running in at least one of the first thread of the shaft and the second thread of the impeller;
(iv) applying a layer of coating onto at least one of the first thread of the shaft and the second thread of the at least one impeller, the coating increasing a surface pressure between the first thread of the shaft and the second thread of the at least one impeller; and
(v) wetting at least one of the first thread of the shaft and the second thread of the at least one impeller with a liquid containing a ceramic;
wherein melting the solder platelet includes at least one of induction heating and heating with a beam.

17. A rotor for at least one of a turbine and a compressor of a supercharging device, comprising:
a shaft defining an axis of rotation and at least one impeller;
the at least one impeller including a first thread arranged coaxially to the axis of rotation;
the shaft including a second thread complementary to the first thread arranged coaxially to the axis of rotation;
the shaft and the at least one impeller being secured together via the first thread and the second thread;

the first thread of the at least one impeller including one of an external thread arranged on a threaded pin and an internal thread arranged in a bore, and the second thread of the shaft including the other of the external thread arranged on the threaded pin and the internal thread arranged in the bore;

wherein the threaded pin includes a centring portion defining a diameter and the bore includes a centring portion defining a complementary diameter that together with the centring portion of the threaded pin facilitates radial guidance and radial centring of the at least one impeller and the shaft relative to one another; and wherein the shaft and the at least one impeller are fixed with respect to one another via at least one of a soldered connection, a welded connection, an adhesive bond, a clamped connection and a crystallization connection.

18. The rotor according to claim 17, wherein the first thread of the at least one impeller and the second thread of the shaft are fixed via at least one of the soldered connection, the welded connection and the adhesive bond.

19. The rotor according to claim 17, wherein the threaded pin is secured to a bottom of the bore via the adhesive bond.

20. The rotor according to claim 17, further comprising a solder reservoir defined by a hollow space between the threaded pin and a bottom of the bore.

* * * * *